United States Patent
Stephens et al.

(10) Patent No.: US 11,079,293 B2
(45) Date of Patent: Aug. 3, 2021

(54) REMOTE MEASUREMENT OF BLAST WAVE PROPAGATION

(71) Applicant: United States of America—US Army, Alexandria, VA (US)

(72) Inventors: Catherine S Stephens, Clinton, MS (US); Clifford E Grey, Vicksburg, MS (US); Roland Fuentes, Owens Cross Roads, AL (US); Larry Watkins, Meridianville, AL (US)

(73) Assignee: UNITED STATES of AMERICA AS REPRESENTED BY THE SECRETARY OF THE ARMY, Alexandria, VA (US)

( * ) Notice: Subject to any disclaimer, the term of this patent is extended or adjusted under 35 U.S.C. 154(b) by 156 days.

(21) Appl. No.: 15/721,870

(22) Filed: Sep. 30, 2017

(65) Prior Publication Data

US 2019/0101464 A1    Apr. 4, 2019

(51) Int. Cl.
*G01L 5/14* (2006.01)
*F42D 5/04* (2006.01)

(52) U.S. Cl.
CPC . *G01L 5/14* (2013.01); *F42D 5/04* (2013.01)

(58) Field of Classification Search
CPC ................................... G01L 5/14; F42D 5/04
USPC ............................................. 73/35.14, 35.15
See application file for complete search history.

(56) References Cited

U.S. PATENT DOCUMENTS

2006/0193207 A1*  8/2006  Zubkow ................. G01V 1/008
                                                           367/178
2015/0143875 A1*  5/2015  Wong ....................... G01L 5/14
                                                            73/35.14

* cited by examiner

*Primary Examiner* — David Z Huang
(74) *Attorney, Agent, or Firm* — Brian C. Jones

(57) ABSTRACT

The method and system disclosed herein allow pressure profile data to be collected remotely from multiple autonomous sensors without entering the blast radius. The system obtains a GPS synchronized time value for detonation and obtains subsequent synchronized pressure data sets overtime from multiple independently functioning remote and correlates that data from each transducer with the initial detonation event.

7 Claims, 2 Drawing Sheets

REMOTE MEASUREMENT OF BLAST WAVE PROPAGATION

STATEMENT REGARDING FEDERALLY SPONSORED RESEARCH OR DEVELOPMENT

The invention described herein was made by an employee of the United States Government and may be manufactured and used by the Government of the United States of America for governmental purposes without the payment of any royalties thereon or therefore.

FIELD OF INVENTION

This invention relates to the field of blast wave measurement and more specifically to creating a blast wave data profiles from sensors.

BACKGROUND OF THE INVENTION

A blast wave is the measurable phenomenon caused by the sudden and violent release of energy in an explosive charge. The blast causes a sharp rise in the pressure of the surrounding atmosphere.

A blast profile is a time history of the pressure wave measured at a particular point in space using sensors, referred to as transducers. To characterize the time signature of a blast-pressure event, pressure transducers are placed at varying distances from the blast source.

The sudden increase in pressure P is measured over at various points in time (t). The pressure of initial blast wave peaks and then decays at the location of each transducer.

It is a problem known in the art that multi-point transducer systems rely on cable network connections to measure blast wave pressure profiles which connect transducers to a central device that receives the signals and records the time of the signals upon arrival.

Synchronization errors of even a few thousandths of a second can interfere with the accuracy of blast wave pressure profile measurements.

Transducers are subject to mechanical differences and impedance errors in transmitting electrical signals from a transducer to a central network device.

There is an unmet need for highly synchronized wave blast measurement tools that can accurately transmit wave profile data for comprehensive analysis.

BRIEF SUMMARY OF THE INVENTION

The system and method described herein captures multiple blast measurements at various locations. A master sensing unit is used to synchronize a sensed detonation signal to an external GPS signal. Multiple independent transducers autonomously gather and transmit synchronized blast data, and are independently synchronized to the master transducer by the use of a pulse per second signal.

The method and system disclosed herein allow pressure profile data to be collected remotely from multiple autonomous sensors without entering the blast radius. The system obtains a GPS synchronized time value from a master sensing component time value for the initial detonation and obtains synchronized pressure profile data sets of pressure over time from multiple independently functioning transducers, which are then correlated with the synchronized time value recorded for the initial detonation event.

BRIEF DESCRIPTION OF SEVERAL VIEWS OF THE DRAWING(S)

TERMS OF ART

As used herein, the term "APPRT" apparatus means Autonomous Pressure Profile Recorder (APPR) apparatus to measure blast wave propagation.

As used herein, the term "blast profile data structure" means a data structure which contains data for a blast profile, including the time of a sensed detonation (or other measurement phenomena) event with location coordinates and with a range of time and pressure values obtained after the sensed event.

As used herein, the term "distributed computer apparatus" means a pulse per second (pps) computer apparatus having memory, processing and other components in One or multiple locations.

As used herein, the term "external GPS signal" means a pulse per second (PPS or 1 PPS) is an electrical signal that has a width of less than one second which accurately repeats once per second, and is generated by frequency standards, precision oscillators and or a "Global Positioning System" (GPS).

As used herein, the term "detonation" means any pressure phenomena capable of measurement.

As used herein, the term "non-volatile memory" means system memory which can store data.

As used herein, the term "pressure profile" means a set of data for pressure over time associated with a location and a detonation signal.

As used herein, the term "processor" means computer hardware which includes circuitry structurally placed to perform calculations, functions and operations which may be limited, determined or designated by software.

As used herein, the term "receiver" has its normal meaning in the art.

As used herein, the term "recording function" means a process for recording data for a pre-determined duration.

As used herein the term "sensed detonation time $T_0$" means the time at which at detonation event reaches an initial sensor, e.g. on a master sensing unit.

As used herein, the term "$T_{1...n}$" means a series of time which occur subsequent to $T_0$.

As used herein, the term "wave, propagation data set" means data obtained from multiple transducers.

DETAILED DESCRIPTION OF THE INVENTION

Figure 1:
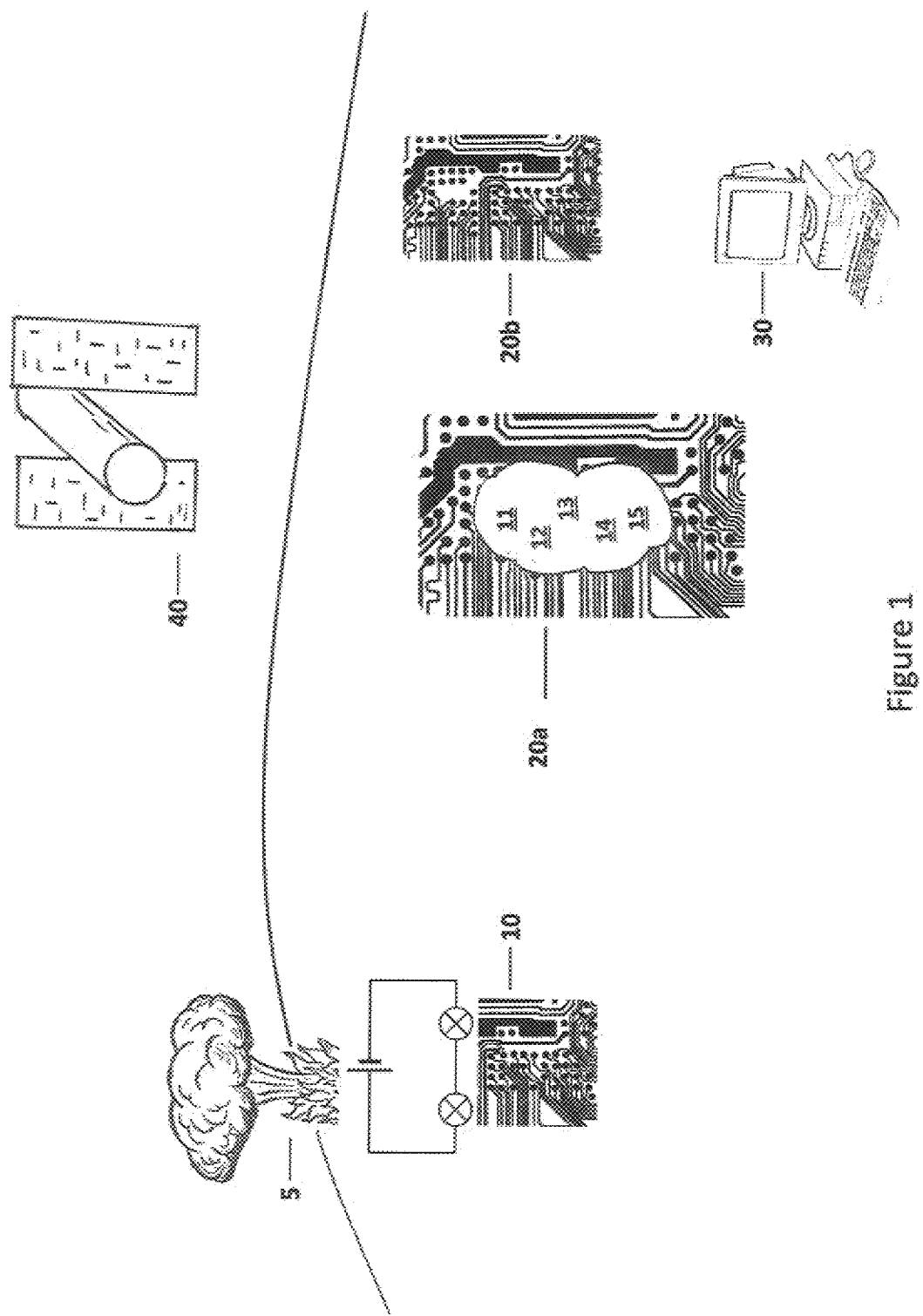
FIG. 1 illustrates an exemplary System 100 using multiple Autonomous Pressure Profile Recorder (APPR) apparatuses to measure blast wave propagation.

FIG. 1 illustrates an exemplary System 100 using multiple Autonomous Pressure Profile Recorder (APPR) apparatuses to measure blast wave propagation.

In the exemplary embodiment shown in FIG. 1, distributed Autonomous Pressure Profile Recorder (APPR) System 100 is a distributed computer system that includes detonation 5, master sensing unit 10, APPR apparatuses 20a-b, external computer 30, and external GPS signal 40.

Master sensing unit 10 has a clock which is synchronized to external GPS signal 40, and a recorder which records $T_0$ when a circuit breaks in response to detonation 5. Master sensing unit 10 further includes a transmitter for wirelessly sending data to external computer 30 to allow measurements to be collected remotely without entering the blast area.

In the exemplary embodiment shown, each APPR apparatus 20a and 20b captures, records, and transmits high speed transient electrical signals generated from electrical transducers incorporated into the APPR apparatus. Each APPR apparatus 20a and 20b includes a transducer and a receiver, which are operatively coupled. The transducer is configured to emit pressure reading P. Each APPR apparatus 20a and 20b includes a high-speed voltage input recording circuit which directly receives voltage output from a transducer. When the P output from the transducer increases due to a measurement phenomenon, the circuit recognizes the sudden increase in pressure and stores data recorded within a predetermined amount of time before and after the trigger threshold has occurred, to ensure that all relevant data are collected. In the exemplary embodiment shown, the measurement phenomenon is the movement of a blast wave past an APPR apparatus 20a or 20b, following detonation 5.

Each APPR apparatus 20a and 20b further includes a processor 13 which compares Plan to a threshold value, and a recording component 12, which activates when $P_{1 \ldots n}$ exceeds that threshold value. When output P from a transducer 11 exceeds a threshold value, it indicates that the blast wave from detonation 5 has reached that transducer.

Each APPR apparatus 20a and 20h further includes a clock 15, which is synchronized to external GPS signal 40 and a memory component for storing a pressure profile data structure 14 which includes Time $T_{1 \ldots n}$ and Pressure $P_{1 \ldots n}$ for each $P_{1 \ldots n}$ larger than said threshold value. APPR apparatus 20a and 20h each record GPS and location data, allowing, for time synchronization and georeferencing. In various embodiments, the pressure profile data structure includes the GPS coordinates of the transducer.

Each APPR apparatus 20a-b further includes a transmitter for wirelessly sending data to external computer 30 to allow measurements to be collected remotely without entering the blast area. In various embodiments, the APPR transmitter transfers data to a computer having a non-volatile memory component, which can then be offloaded to other computers via a wireless connection.

In various embodiments, APPR apparatus 20a and 20b each include non-volatile memory data structures for storing and associating GPS time and location coordinates for the incorporated transducer. In various embodiments, the memory component of APPR apparatus 20a or 20b may be non-volatile to limit battery drainage.

External computer 30 stores data from each APPR apparatus 20a and 20b and data from master sensing unit 10.

Figure 2:
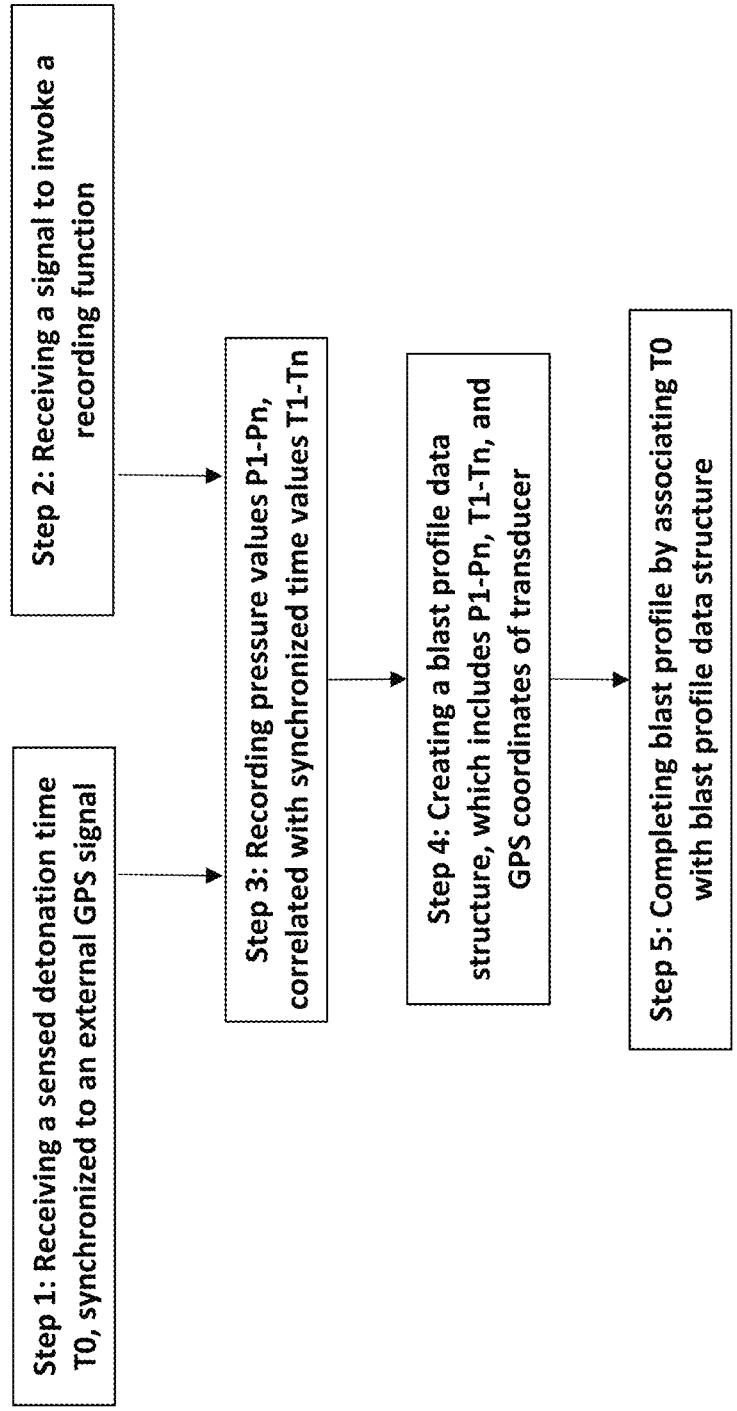
FIG. 2 illustrates an exemplary Method 200 for remotely measuring blast wave propagation using multiple Autonomous Pressure Profile Recorder (APPR) apparatuses.

FIG. 2 illustrates an exemplary Method 200 for remotely measuring blast wave propagation using multiple Autonomous Pressure Profile Recorder (APPR) apparatuses.

With the use of high gain antennas, Method 200 is accomplished wirelessly via Wi-Fi protocols. Method 200 eliminates the need for long lengths of wire and the associated labor costs of running the wire and verifying the proper operation of the wire connections. Method 200 further eliminates the need for high-speed data recorders that accommodate multiple transducer inputs. Method 200 further eliminates synchronization errors caused by impedance experienced with wiring connections.

Method 200 GPS position coordinates eliminates the possibility of confusing where each transducer is located when data is collected in a multi-channel recorder associated with a large number of wiring connections.

Method 200 is implemented using a computer processor and memory storage.

Step 1 is the step of an Autonomous Pressure Profile Recorder (APPR) apparatus receiving a sensed detonation time $T_0$, which is synchronized to an external GPS signal.

Step 2 is the step of an APPR apparatus receiving a signal to invoke a recording function.

Step 3 is the step of an APPR apparatus performing a recording function to record transducer outputs, which are pressure values $P_{1 \ldots n}$ and Time values $T_{1 \ldots n}$ Time values $T_{1 \ldots n}$ are synchronized to said external GPS signal.

Step 4 is the step of an APPR apparatus creating a blast profile data structure, which includes $P_{1 \ldots n}$, $T_{1 \ldots n}$, and GPS coordinates of the transducer.

Step 5 is the step of completing a blast profile by associating sensed detonation time $T_0$ with a blast profile data structure. This step may or may not be completed by an external computing component.

It will be understood that many additional changes in the details, materials, procedures and arrangement of parts, which have been herein described and illustrated to explain the nature of the invention, may be made by those skilled in the art within the principle and, scope of the invention as expressed in the appended claims.

It should be further understood that the drawings are not necessarily to scale; instead, emphasis has been placed upon illustrating the principles of the invention.

What is claimed is:

1. A distributed Autonomous Pressure Profile Recorder (APPR) system for measuring multiple blast measurements from various locations, which is a distributed computer system comprised of:

a master sensing unit with a recorder which records a sensed detonation signal including a sensed detonation time $T_0$ when a circuit breaks in response to a detonation, said master sensing unit being highly synchronized to within less than a thousandth of a second to an external GPS signal wherein said external GPS signal is a pulse per second electrical signal that has a width of less than one second and accurately repeats once per second;

a plurality of APPR apparatuses placed varying distances from a blast source, each comprised of:

a pressure transducer, wherein said pressure transducer is configured to output pressure reading P, said pressure reading P sampled at time $T_{1 \ldots n}$ to produce $P_{1 \ldots n}$;

a recording component;

a processor which compares $P_{1 \ldots n}$ to a threshold value and activates said recording component when $P_{1 \ldots n}$ exceeds said threshold value;

a pressure profile data structure which stores time values $T_{1 \ldots n}$ for each $P_{1 \ldots n}$ larger than said threshold value; and a clock which is synchronized to said external GPS signal and an APPR memory component for storing said pressure profile data structure for each of said plurality of APPR apparatuses; and an external computer having a memory which stores data from said plurality of APPR apparatuses and data from said master sensing unit and wherein said external computer receives APPR data packets and correlates each of said APPR data packets with said sensed detonation time $T_0$ to complete a blast profile data structure containing time values, pressure values, and GPS coordinates from each of the plurality of APPR apparatuses.

2. A method for measuring a blast wave propagation implemented using a computer processor and memory storage, comprised of the steps of:

receiving a sensed detonation time $T_0$, wherein $T_0$ is synchronized to an external GPS signal to within less than a thousandth of a second wherein said external GPS signal is a pulse per second electrical signal that has a width of less than one second and accurately repeats once per second;

receiving a signal to invoke a recording function;

performing a recording function in one or more APPR apparatus of claim 1 to record transducer pressure and time value outputs, wherein said time value outputs are synchronized to said external CPS signal;

storing $P_{1...n}$ over $T_{1...n}$ with GPS coordinates in a blast profile data structure; and associating said sensed detonation time $T_0$ with said blast profile data structure to create a complete blast profile.

3. The method of claim 2 which further includes the step of transferring said blast profile data structure to memory of an external computing component.

4. The method of claim 3 wherein said external computing component iteratively processes said blast profiles from each transducer to produce a wave propagation data set.

5. The method of claim 4 wherein said external computing component processes said blast profiles to graphically represent said blast wave propagation.

6. The method of claim 2 which further includes the step of filtering said pressure and time value outputs using a P threshold value.

7. The method of claim 6 which further includes the step of storing filtered pressure values $P_{1...n}$ and corresponding time value $T_{1...n}$ for each of said P larger than said P threshold value.

* * * * *